(12) United States Patent
Lee et al.

(10) Patent No.: US 10,015,043 B2
(45) Date of Patent: Jul. 3, 2018

(54) METHOD FOR SELF-CONSTRUCTION OF MULTIPLE WIRELESS NETWORKS

(71) Applicant: hyBee, Inc., Seongnam-si (KR)

(72) Inventors: Yong Hwan Lee, Seoul (KR); Jin Seok Han, Gunpo-si (KR)

(73) Assignee: hyBee, Inc., Seongnam-si (KR)

( * ) Notice: Subject to any disclaimer, the term of this patent is extended or adjusted under 35 U.S.C. 154(b) by 93 days.

(21) Appl. No.: 15/363,073

(22) Filed: Nov. 29, 2016

(65) Prior Publication Data

US 2017/0155552 A1  Jun. 1, 2017

(30) Foreign Application Priority Data

Nov. 30, 2015 (KR) .................. 10-2015-0168446

(51) Int. Cl.
*H04L 12/24* (2006.01)
*H04W 8/24* (2009.01)
*H04W 16/22* (2009.01)
*H04W 36/08* (2009.01)
*H04W 36/34* (2009.01)
*H04W 40/24* (2009.01)
(Continued)

(52) U.S. Cl.
CPC .......... *H04L 41/0803* (2013.01); *H04L 41/12* (2013.01); *H04W 8/005* (2013.01); *H04W 8/245* (2013.01); *H04W 16/22* (2013.01); *H04W 36/08* (2013.01); *H04W 36/34* (2013.01); *H04W 40/244* (2013.01); *H04W 40/36* (2013.01); *H04W 48/08* (2013.01); *H04W 48/16* (2013.01); *H04W 48/20* (2013.01); *H04W 84/12* (2013.01); *H04W 88/08* (2013.01); *H04W 88/12* (2013.01); *H04W 92/12* (2013.01)

(58) Field of Classification Search
CPC ... H04L 41/0803–41/12; H04W 8/005; H04W 8/22–8/30; H04W 16/02–16/20; H04W 36/08–36/385; H04W 40/24–40/38; H04W 48/02–48/20; H04W 60/005–60/06; H04W 84/12; H04W 88/08–88/12; H04W 92/10–92/12
See application file for complete search history.

(56) References Cited

U.S. PATENT DOCUMENTS

2015/0036537 A1* 2/2015 Kim ..................... H04W 60/00
                                                              370/254
2016/0286568 A1* 9/2016 Leroux ................. H04L 5/0073
                                                              370/329

* cited by examiner

*Primary Examiner* — Timothy J Weidner
(74) *Attorney, Agent, or Firm* — The Webb Law Firm

(57) ABSTRACT

Provided is a network self-construction method of connecting network devices to a specific network in a wireless application environment in which network devices must be divided into multiple networks in the same space. An access point (AP) controls network association of the network devices by transmitting a beacon signal into which information indicating association permission or non-permission of a network operated by the AP is inserted. A system manager associates the network devices with a specific network through the AP. When the network construction is completed, the system manager disables the AP from permitting additional network association. By repeating these steps, new networks are sequentially constructed. The system manager performs network construction by dividing the network devices into multiple networks in a desired structure and supports additional network association of network devices and transfer to other networks.

8 Claims, 3 Drawing Sheets

(51) Int. Cl.
*H04W 40/36* (2009.01)
*H04W 48/08* (2009.01)
*H04W 48/16* (2009.01)
*H04W 48/20* (2009.01)
*H04W 84/12* (2009.01)
*H04W 88/08* (2009.01)
*H04W 88/12* (2009.01)
*H04W 92/12* (2009.01)
*H04W 8/00* (2009.01)

METHOD FOR SELF-CONSTRUCTION OF MULTIPLE WIRELESS NETWORKS

CROSS-REFERENCE TO RELATED APPLICATION

This application claims priority to Korean Patent Application No. 10-2015-0168446 filed Nov. 30, 2015, the disclosure of which is hereby incorporated in its entirety by reference.

BACKGROUND OF THE INVENTION

Field of the Invention

The present invention relates to a network self-construction method, in which a system manager performs network construction of network devices into multiple networks in a desired structure.

Description of Related Art

With the recent advances in Micro Electro Mechanical System (MEMS)-based sensor technologies, low-power analog and digital electronic technologies, low-power RF design technologies, and the like, research has been actively conducted to develop wireless sensor network technologies using low-cost, low-power sensors. A wireless sensor network includes an access point (AP) that controls a network operation, and a plurality of network devices that are controlled by the AP.

The following wireless networking technology is essential for an application environment in which network devices must be separated into a number of networks in the same space. First, a system manager must be able to perform network construction by separating network devices into multiple networks in a desired structure. That is, the system manager must be able to connect each network device to a specific network. Second, the system manager must support network association of additional network devices and network transfer of network devices to other networks.

For example, considering an application environment in which network devices in an office are managed by a plurality of APs, network devices of a specific section area must be associated to an AP managing the corresponding section area. When it is necessary to change the section area of some network devices after network construction, the network devices must be able to leave the existing network and make association to a new network.

ZigBee, 6LoWPAN, or the like, which is a representative low-power wireless networking technology, cannot support the above-described self-construction of multiple wireless networks. For example, in the case of ZigBee, when a plurality of APs are installed in the same place and network devices are powered on, the network devices attempt to make association to an arbitrary AP. Thus, a system manager cannot perform the multiple-network construction in a desired structure. Z-Wave can manually construct a network, in which a controller needs to manually take care of each network device for network association to the network. Thus, Z-wave is applicable only to the construction of a small-size network.

SUMMARY OF THE INVENTION

One or more embodiments of the present invention include a network self-construction method of associating network devices to a specific AP in a wireless application environment in which network devices must be separated into multiple networks in a same place.

According to one or more embodiments, an AP manages network association of network devices by transmitting a beacon signal including a command on the permission or non-permission of a network association by the AP. When a network construction is completed, a system manager disables the AP from allowing additional association process. By repeating these processes, new networks can be constructed sequentially. The system manager may perform construction of multiple networks by separating the network devices in a desired structure and may support additional network devices to associate a network and network devices associated to a network to associate to other networks.

According to one or more embodiments of the present invention, there is provided a network self-construction method for use in a wireless communication system comprising L APs each of which manages a network operation, and a plurality of network devices each of which makes operation through network association to one of the APs, in which the AP transmits a beacon signal including information on association permission/non-permission of a network device to the AP and a network identifier (NI) information of the AP, and a system manager managing the APs performs network construction by separating the wireless communication system into L networks, the method including: (A) transmitting, by the system manager, a network construction permission command, an NI information and the number of association-permitted network devices to a specific AP among the APs, and powering on only network devices to be associated to the specific AP, so as to make the network devices associate to the network; (B) transmitting, by the system manager, a network construction non-permission command to the specific AP when a network construction of the specific AP is completed, and repeating step (A) to another AP, whose network construction has not yet been completed, so that the L networks are separately constructed in a sequential manner; (C) when J network devices among the network devices associated to a certain network a need to associate to a certain network b after the successful construction of the L networks, managing, by the system manager, an APa (AP of the network a) to transmit a network association initialization command and the NI information of the target network b to the J network devices, and transmitting a network construction permission command and the number J of network devices to be newly associated to an APb (AP of the network b in which the J network devices are to be associated), so that the J network devices change the network association; and (D) when a certain AP recognizes that K network devices among the network devices belonging to the AP's network are disassociated from the network (that is, when K orphan devices occur) during steps (A), (B), and (C) or after the completion of steps (A), (B), and (C), healing the network association by requesting the system manager for network construction permission and then reassociating the disassociated network devices.

In steps (A), (C), and (D), the associating of the network devices with the network may include: when the network device is powered on or recognizes the disassociation from the network to which the network device is associated, changing the operation state to a state in which a network association initialization command is received; receiving beacon signals from neighboring APs by using a conventional network scanning technique after reception of a network association initialization command; when the network device has no NI information, requesting network association to an AP permitting the network association; when the network device has an NI information, requesting network association to the corresponding AP; when the network device successfully makes the network association, storing the NI information of the corresponding AP; and transmitting an association success message to the corresponding AP.

The method may further include: when the network device has been denied for association request by the AP, retrying the network association process; and when the network device has failed the network association consecutively more than or equal to a predetermined reference value, quitting the network association to the AP and trying to make network association to another AP permitting the network association.

In steps (A), (C), and (D), the recognizing, by the system manager, the completion of the network construction, transfer, or healing of the corresponding AP may include: assuming that N is the number of network devices to be constructed, transferred, or healed, when the network device is assigned a network address by the AP, determining that the network device successfully makes network association and transmitting an association success message to the AP; when the AP receives N association success messages from the network devices, transmitting a network construction success message to the system manager; and when the system manager receives the network construction success message from the AP, transmitting a network construction non-permission command to the AP.

The system manager may manage a network construction permission command so that only one AP participates in the network construction, transfer, or healing process for a specific time interval.

When the AP constructs an AP's own network in a multi-hop structure, router devices that belong to the AP may transmit the router devices' own beacon signals and transmit network devices beacon signals including a network association permission/non-permission command and an NI information, so as to construct, transfer, or heal the network as in the AP.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, operation principles according to exemplary embodiments of the present invention will be described in detail with reference to the accompanying drawings. While describing the present invention, detailed descriptions about related well-known functions or configurations that may diminish the clarity of the points of the present invention are omitted. The terms as used herein are those general terms currently widely used in the art by taking into account functions in the present invention, but the terms may vary according to the intention of those skilled in the art, precedents, or the like. Thus, the terms as used herein should be understood based on the overall description of the present disclosure.

Figure 1:
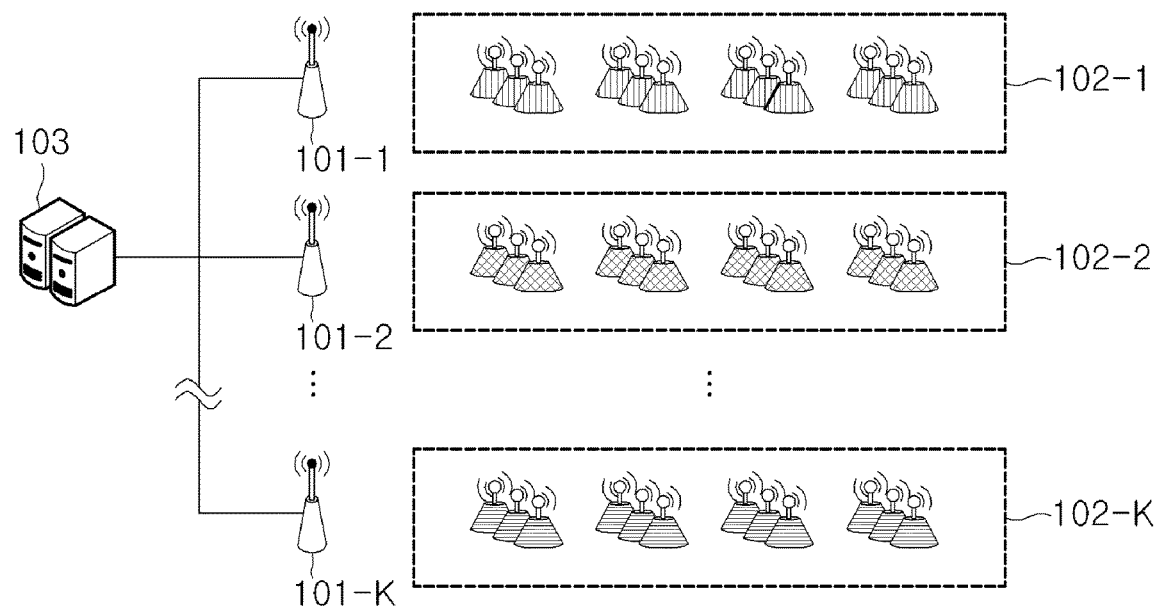
FIG. 1 illustrates a topology of a wireless communication system, to which the present invention is applicable.

As shown in FIG. 1, a wireless communication system, to which the present invention is applicable, includes K APs 101 configured to control one network operation, network devices 102 configured to operate via connection to a network of one of the APs 101, and a system manager 103 configured to control an overall operation of the system. Such a system configuration will be described in more detail with reference to FIG. 1. At the beginning, the network devices belonging to groups 102-1, 102-2, . . . , 102-K must operate via connection to networks of APs 101-1, 101-2, . . . , and 101-K, respectively. According to an embodiment of the present invention, association permission or non-permission of each network is defined by 1-bit flag information P. P=0 may indicate that association of new network devices is not permitted, and P=1 may indicate that association of new network devices is permitted. Also, the network devices may define their network association or non-association by 1-bit flag information I. I=0 may indicate that the network device is not associated with a network, and I=1 may indicate that the network device is associated with a network.

Figure 2:
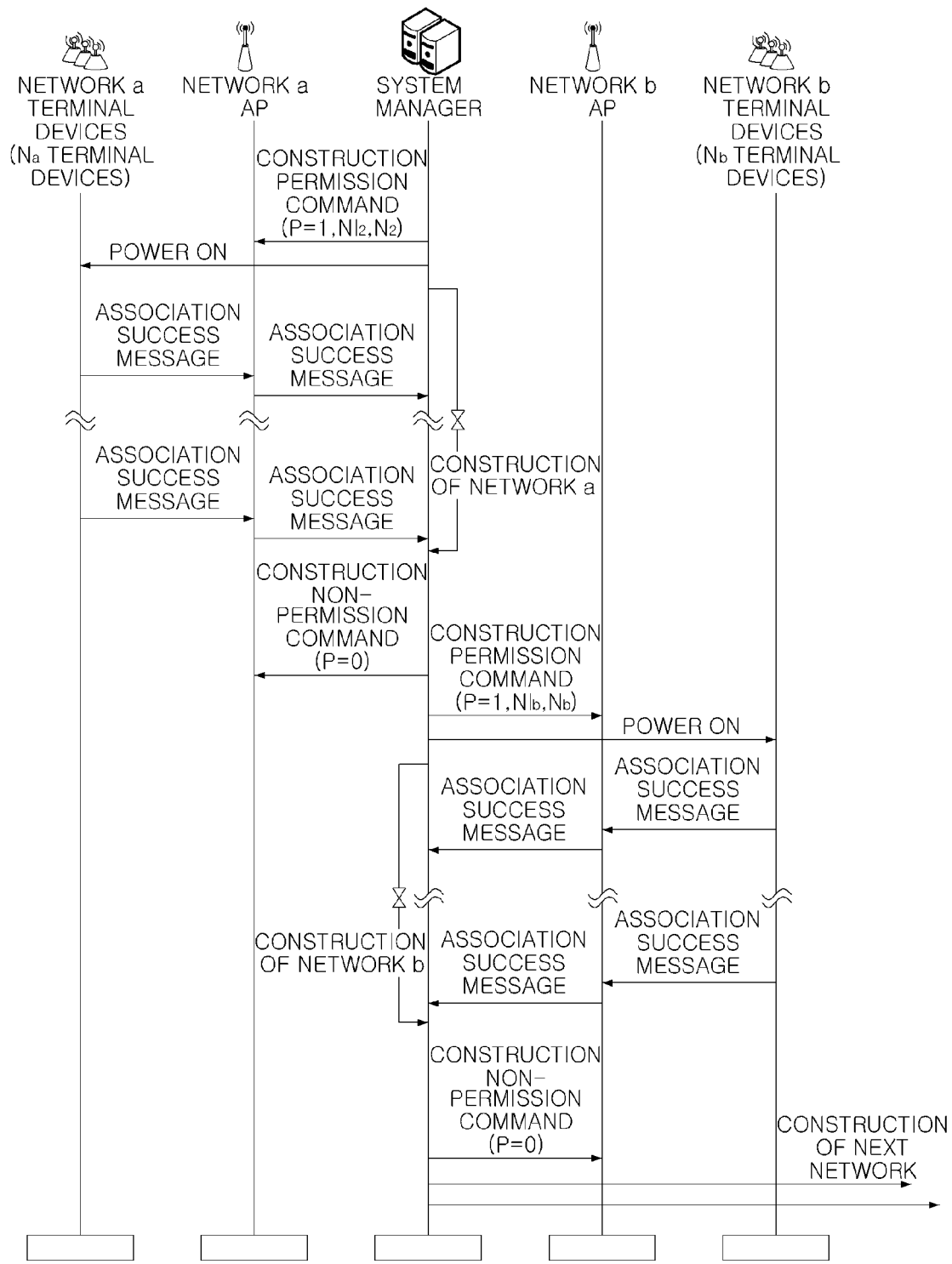
FIG. 2 illustrates an overall configuration of the present invention.

The overall configuration of the present invention is shown in FIG. 2. According to an embodiment of the present invention, networks are sequentially constructed one by one in order for separate construction of K networks. Before a system manager starts network construction, all network devices are in a power-off state and APs are initially in a P=0 state in which association of network devices is not permitted. The system manager transmits an association control message including P=1 command, a network identifier (NI) Nia, and the number Na of associated network devices, to an APa, i.e., an AP of a first network (network a), and the APa receiving the P=1 command starts network association. Also, when only network devices to be associated to the network a (Na network devices) are powered on (i.e., I←0), the APa and the powered-on network devices construct the network a. In the network construction process, if a network device is assigned a network address, the network device determines that association is successful (i.e., I←1), store the Nia, and transmits an association success message including I=1 to the APa. The APa receiving the association success message transmits information on the corresponding network device to the system manager. When the APa receives the association success messages from the Na network devices, the system manager determines that the construction of the network a is completed, and issues an association control message including P=0 command to the APa so as to change the APa to a state in which the APa is not allowed for network association of additional network devices.

The system manager starts constructing a next network (network b). The system manager transmits an association control message including P=1 command, Nib, and the number Nb of network devices to be associated to an APb, i.e., an AP of the network b, and the APb receiving the P=1 command starts network association. Also, after only Nb network devices to be associated to the network b are powered on (i.e., I←0), the APb and the powered-on network devices construct the network b. In the network construction process, if a network device is assigned a network address, the network device determines that the association is successful (i.e., I←1), store the Nib, and transmits an association success message including I=1 to the APb. The APb receiving the association success message transmits information on the corresponding network device to the system manager. When the APb receives the association success messages from the Nb network devices, the system manager determines that the construction of the network b is completed, and issues an association control message including P=0 command to the APb so as to change the APb to a state in which the APb is not allowed for association of additional network devices. By sequentially performing the above-described processes K times, the system manager may complete the network construction in which the wireless communication system is separated into K networks.

When J network devices among the network devices connected to the network a need to be associated to the network b during the normal system operation, the system manager transmits the APa (the AP of the network a) a re-association control message including a command of I←0 and the Nib (NI of the network b) which will be transmitted to the J network devices by the APa, and transmits a re-association control message including a command of P=1 and the number J of network devices to be additionally associated to the APb (the AP of the network b), so that the J network devices makes network association to the network b. The network devices request only the AP APb corresponding to the received NI information for network association. If a network device is assigned a network address, the network device determines that the association is successful, and transmits an association success message including I=1 to the APb. The APb receiving the association success message transmits information on the corresponding network device to the system manager. When the APb receives the association success messages from the J network devices, the system manager determines that the network transfer of the network devices to the new network b is completed, and issues a re-association control message including P=0 command to the APb so as to change the APb to a state in which the APb is not allowed for association of additional network devices.

When the AP recognizes that the network device belonging to the AP's own network is associated to another network or is disassociated from the AP's own network, the AP retrieves the address assigned to the corresponding network device.

In the process of the network construction or normal operation, the AP may use a result of signal transmission and reception of the network devices to detect whether a network device belonging to the AP is disassociated from the network (that is, whether an orphan device occurs). When the AP detects that K network devices are disassociated from the AP's network, the AP requests the system manager for a permission of network association. The system manager issues a re-association control message including P=1 command to the AP requesting the network association so as to permit the network association. When the AP receives association success messages from the K network devices, the system manager determines that network healing of the AP is completed, and issues a re-association control message including P=0 command to the AP so as to change the AP to a state in which the AP is not allowed for association of additional network devices.

Figure 3:
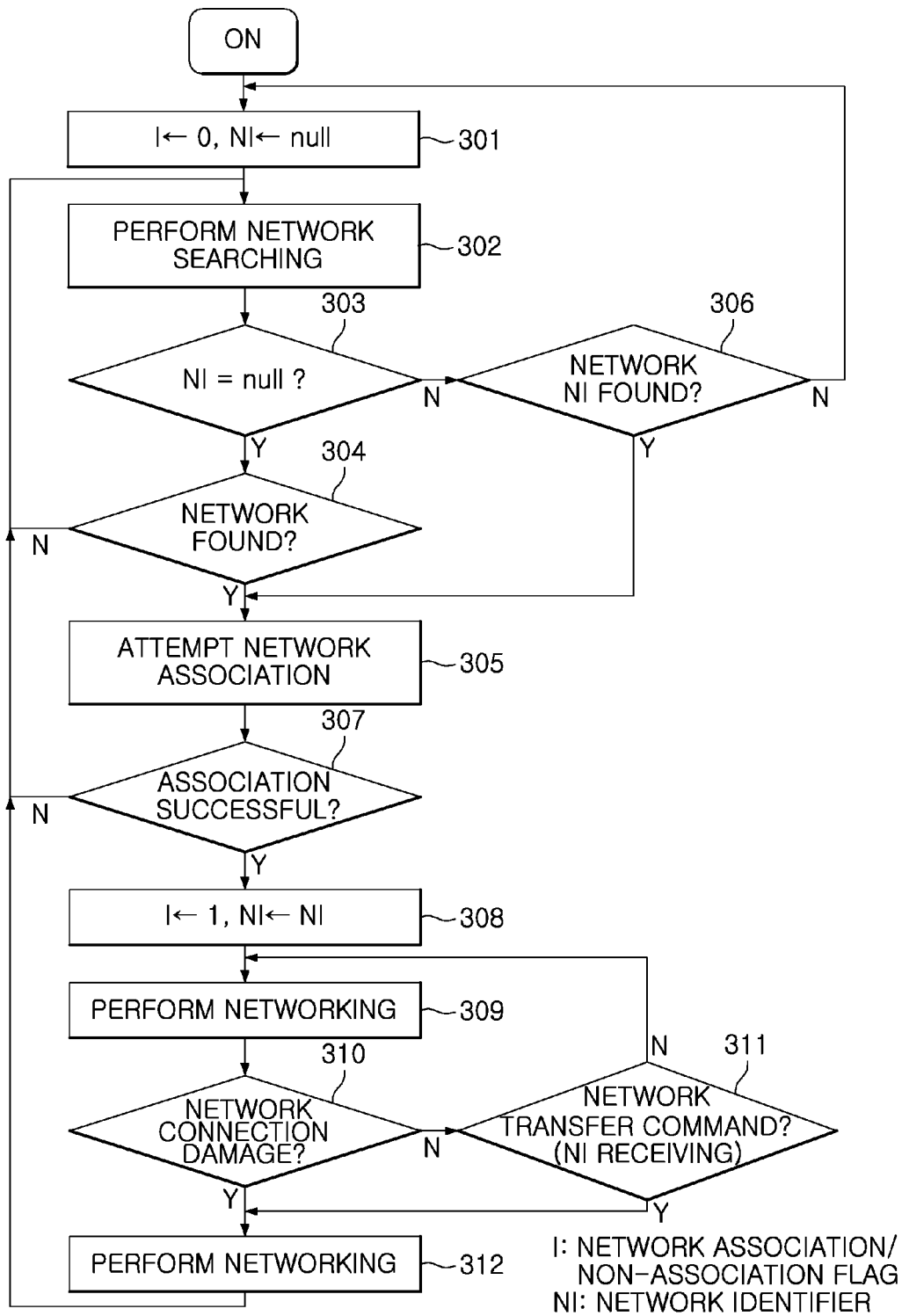
FIG. 3 illustrates an operation principle of a network device according to an embodiment of the present invention.

The operation principle of the network device, according to an embodiment of the present invention, is shown in FIG. 3. The network device determines an operation by using flag information I indicating whether the network device is associated to the network and NI representing the network to which the network device currently belongs or must belong. In operation 301 of FIG. 3, when the network device is switched to a power-on state, the network device sets I←0 and sets NI←null because the network device is not associated to any network. In operation 302 of FIG. 3, the network device receives beacon signals transmitted from neighboring devices by using a conventional network scanning technique. In operation 303 of FIG. 3, the network device determines an operation according to the NI. A network device that is not associated to any network has an NI of null. Thus, the network device with a null NI detects whether any network permitting the association exists in operation 304 of FIG. 3, and repeats network scanning if any network is not found in operation 302. When the network device detects a network permitting the association, the network device initiates network association in operation 305 of FIG. 3. When the network device is not assigned a network address, the network device determines that the association is failed and repeats network scanning in operation 302. When the network device successfully makes network association, the network device sets I←1, stores the NI, and transmits an association success message including I=1 to the AP in operation 308 of FIG. 3. Then, the network device performs networking operation including data transmission and reception in operation 309 of FIG. 3. When no network dis-connection occurs in operation 310 of FIG. 3 and no network association command is transmitted from the AP in operation 311 of FIG. 3, the network device continues networking operation in operation 309. When the network is disconnected during the networking in operation 310 of FIG. 3 (for example, when the beacon signal is not consecutively received, or when data transmission is consecutively failed), the network device sets I←0 in operation 312 of FIG. 3. However, since the network device has the NI, the network device initiates network reassociation to the network (that is, the network being already associated). After operation 303, when the network device finds the network being already associated in operation 306, the network device initiates the network association in operation 305. When the network device does not find the network being already associated, the network device initializes itself, while setting I←0 and NI←null, and restarts in operation 301. When the network device receives a network transfer (re-association) message during the networking operating in operation 311 of FIG. 3, the network device sets I←0 and initiates network association based on NI.

The system manager manages the operation so that only one AP participates in the above-described processes, thereby preventing operation conflict between the APs.

In a network construction method according to an embodiment of the present invention, network association permission/non-permission information is included in a network beacon signal for network scanning of network devices, and a system manager controls association permission or non-permission. Accordingly, the system manager may perform network construction by separating network devices into multiple networks in a desired structure and may easily support network change of the network devices.

Although preferred embodiments of the present invention have been described for illustrative purposes, those skilled in the art will appreciate that various modifications, additions and substitutions are possible, without departing from the scope and spirit of the invention as disclosed in the accompanying claims.

Therefore, the embodiments of the present invention are disclosed only for illustrative purposes and should not be construed as limiting the present invention.

What is claimed is:
1. A network self-construction method in a wireless communication system including L access points (APs), each of which manages its own network operation, and a plurality of network devices, each of which makes operation through network association to one of the L APs, in which each AP transmits a beacon signal including an association control message to network devices, and a system manager managing the L APs performs network construction, while separating the wireless communication system into L networks, the method comprising:

(A) transmitting, by the system manager, an association control message including a network construction permission command, a network identifier (NI) information and the number of association-permitted network devices, to a specific AP among the L APs, and powering on only network devices to be associated to the specific AP, so as to associate the network devices to the specific AP's network; and (B) transmitting, by the system manager, an association control message including a network construction non-permission command to the specific AP when a network construction of the specific AP is completed, and repeating step (A) to another AP, whose network construction has not yet been completed, so that the L networks are separately constructed in a sequential manner.

2. The method of claim 1, further comprising:

(C) when J network devices among the network devices connected to a certain network a need to be re-associated (or transferred) to a certain network b after the construction of the L networks is completed, commanding, by the system manager, an APa (AP of the network a) to transmit a network association initialization message including an NI information of the target network b to the J network devices, and transmitting an association control message including the number J equal to the number of network devices to be additionally associated to an APb (AP of the network b in which the J network devices are to be associated additionally), so that the J network devices re-associate to the new network b; and (D) when a certain AP detects that K network devices among the network devices associated to the AP's own network are disassociated from the network (that is, when K orphan devices occur) during steps (A), (B) and (C), or after the completion of steps (A), (B) and (C), healing the network disassociation by reassociating the disassociated network devices after getting a network construction permission from the system manager.

3. The method of claim 1, wherein the network association of the network devices comprises:

when the network device is powered on or when the network device detects the disassociation from the network being associated, changing to a state in which a network association initialization command is received;

receiving, by the network device after receiving the network association initialization command, beacon signals from neighboring APs by using a conventional network scanning technique;

when the network device has no NI information, requesting network association to an AP permitting the network association;

when the network device has an NI information, requesting network association to an AP corresponding to the NI information;

when the network device makes successful network association, storing an NI information of the AP being associated; and transmitting, by the network device, an association success message to the AP being associated.

4. The method of claim 3, further comprising:

when a network association request is denied by an AP, repeating, by the network device, the network association process; and when the network device fails network association consecutively larger than or equal to times of a predetermined reference value, quitting the network association to the AP and initiating network association to another AP permitting the network association.

5. The method of claim 1, wherein the detecting, by the system manager, the completion of the network construction, transfer, or healing of the corresponding AP comprises:

assuming that N is the number of network devices to be constructed, transferred, or healed, when the network device is assigned a network address from the AP, determining that the network association is successfully completed and transmitting an association success message to the AP;

when the AP receives N association success messages from N network devices, transmitting a network construction success message to the system manager; and when the system manager receives the network construction success message from the AP, transmitting the AP an association control message including a command which does not allow processing of network construction.

6. The method of claim 1, wherein the system manager manages the command allowing a network construction so that only one AP can process the network construction, transfer, or healing operation during a specific time interval.

7. The method of claim 1, wherein, when the AP constructs an AP's own network in a multi-hop structure, router devices, which can have their own child devices and are associated to the AP's network, transmit the router devices' own beacon signals including an association control message which includes an association permission/non-permission command and an NI information, so as to construct, transfer, or heal the network as in the AP.

8. The method of claim 1, further comprising, when the AP detects that the network device associated to the AP's own network has been re-associated to another network or is disassociated from the AP's own network, retrieving the network address assigned to the corresponding network device.

* * * * *